(12) United States Patent
Otsubo

(10) Patent No.: US 9,906,663 B2
(45) Date of Patent: Feb. 27, 2018

(54) LIGHT SCANNING APPARATUS AND IMAGE FORMING APPARATUS

(71) Applicant: CANON KABUSHIKI KAISHA, Tokyo (JP)

(72) Inventor: Yoshitaka Otsubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/226,410

(22) Filed: Aug. 2, 2016

(65) Prior Publication Data

US 2017/0052472 A1    Feb. 23, 2017

(30) Foreign Application Priority Data

Aug. 19, 2015   (JP) .................. 2015-161969

(51) Int. Cl.
*H04N 1/00*       (2006.01)
*G03G 15/04*    (2006.01)
*G03G 21/16*    (2006.01)

(52) U.S. Cl.
CPC ... *H04N 1/00551* (2013.01); *G03G 15/04036* (2013.01); *G03G 15/04045* (2013.01); *G03G 21/1666* (2013.01)

(58) Field of Classification Search
CPC ......... G03G 15/04036; G03G 21/1666; G03G 2221/1648; G03G 15/04045; H04N 1/00551
See application file for complete search history.

(56) References Cited

U.S. PATENT DOCUMENTS

| | | | |
|---|---|---|---|
| 9,519,259 B2* | 12/2016 | Yoshida | G03G 21/1619 |
| 2004/0076106 A1* | 4/2004 | Yamamoto | G11B 7/121 369/112.1 |
| 2013/0135419 A1* | 5/2013 | Otoguro | G03G 15/04036 347/224 |
| 2016/0147193 A1* | 5/2016 | Yoshida | H04N 1/00559 399/107 |
| 2016/0207328 A1* | 7/2016 | Otoguro | B41J 2/471 |

FOREIGN PATENT DOCUMENTS

JP       2014-012368       1/2014

OTHER PUBLICATIONS

U.S. Appl. No. 15/229,086, filed Aug. 4, 2016; Otsubo (2017/0052474 A1) Pub date Feb. 23, 2017.

* cited by examiner

*Primary Examiner* — Rodney Bonnette
(74) *Attorney, Agent, or Firm* — Fitzpatrick, Cella, Harper & Scinto

(57) ABSTRACT

Provided is a light scanning apparatus, including: a light source emitting a light beam; a rotary polygon mirror deflecting the light beam so as to scan a photosensitive member with the light beam; an optical member guiding the light beam; an optical box on which the light source is mounted and which contains the rotary polygon mirror and the optical member; a cover mounted on a side wall of the optical box so as to cover an opening of the optical box, and the cover having a dust-proof member which is molded on the cover and sandwiched between the cover and the side wall of the optical box; and the dust-proof member including convex portions protruded toward the optical box and configured to contact with a top of the side wall opposed to the dust-proof member, and a concave portion provided between the convex portions and separated from the top.

13 Claims, 7 Drawing Sheets

LIGHT SCANNING APPARATUS AND IMAGE FORMING APPARATUS

BACKGROUND OF THE INVENTION

Field of the Invention

The present invention relates to a light scanning apparatus and an image forming apparatus including the light scanning apparatus.

Description of the Related Art

Hitherto, in an image forming apparatus employing an electrophotographic method, a photosensitive drum having a surface charged to a uniform electric potential is scanned with a light beam which is emitted from a light scanning apparatus based on image information, to thereby form an electrostatic latent image. The formed electrostatic latent image is developed by developer (toner) into a visible image, and the visible toner image is transferred onto a sheet. After that, the unfixed toner image is fixed on the sheet by a fixing unit, and the sheet is delivered. The light scanning apparatus configured to perform scanning with a light beam includes an optical system having a deflection device (scanner motor), which includes a rotary polygon mirror configured to deflect the light beam emitted from a semiconductor laser serving as a light emitting source, an optical lens (fθ lens), a reflecting mirror, and other components. In recent years, there has been an increasing demand for high-speed recording in the image forming apparatus, and hence higher scanning speed in the light scanning apparatus, that is, higher rotation speed of the rotary polygon mirror of the deflection device has been pursued continuously. When the rotary polygon mirror is rotated at high speed, a positive pressure region and a negative pressure region are generated on a mirror surface of the rotary polygon mirror, thereby causing adhesion of dirt, such as fine dust or mist in air, on the negative pressure region of the mirror surface. Such adhesion of dirt on the rotary polygon mirror reduces reflectivity at a portion with the adhesion of dirt. Therefore, the light intensity of a light beam, which is deflected by the rotary polygon mirror and output from the light scanning apparatus, is reduced. There has been a problem in that the reduced light intensity may cause failure in writing to a photosensitive member as well as image degradation on the sheet onto which an image formed on the photosensitive member is transferred.

To address this problem, a related-art light scanning apparatus secures sealability of the light scanning apparatus with the following configuration. Specifically, an opening formed on top of a housing having optical components mounted therein (hereinafter referred to as "optical box") is covered with a cover component (hereinafter referred to as "upper cover") configured to cover the opening, and a soft sealing member such as a foam member is sandwiched between the optical box and the upper cover. Then, the upper cover and the optical box are snap-fitted or fastened with screws. With this, the sealing member is pressed by the optical box and the upper cover to fill a gap between the optical box and the upper cover, thereby securing the sealability of the light scanning apparatus.

In the case of this configuration, there may occur deformation of the upper cover due to a repulsion force of the pressed sealing member, and fatigue degradation of the sealing member due to continuous pressing. Thus, there has been provided a light scanning apparatus in which a surface of the optical box to be brought into contact with the sealing member is formed into a convex shape, and a surface of the sealing member to be brought into contact with the optical box is formed into a concave shape, to thereby reduce the repulsion force of the sealing member in a sealing part. With this, stable dust-proof performance can be achieved. However, in a light scanning apparatus which is liable to cause fatigue degradation of the sealing member, employing only this configuration may lead to insufficient sealability (degree of sealing). Therefore, for the purpose of preventing degradation in the degree of sealing of the optical box, there has been proposed a measure to reduce deformation of the upper cover and fatigue degradation of the sealing member to a maximum extent.

For example, in Japanese Patent Application Laid-Open No. 2014-12368, there is proposed an optical box including a plurality of fixing seats for allowing an upper cover to be fastened thereon with screws. In this optical box, the fixing seats onto which the upper cover is screwed include high fixing seats and low fixing seats. When use is started, the high fixing seats and the upper cover are fastened with screws. The fixing seats are removable. When the sealing member is degraded by fatigue, the upper cover is re-assembled, and the high fixing seats having been used so far are removed. Then, the upper cover is screwed onto the low fixing seats, thereby being capable of fastening the upper cover even under a state in which the sealing member is degraded by fatigue. Further, removing the high fixing seats and screwing the upper cover onto the low fixing seats can suppress deformation of the upper cover due to a repulsion force from the fixing seats.

With the configuration of the optical box described above, deformation of the upper cover and fatigue degradation of the sealing member cannot be prevented when the upper cover is not re-assembled, and hence degradation in the degree of sealing of the optical box cannot be prevented. Further, when the upper cover is re-assembled, there arises a need for another operation involved with replacement of the fixing seats to be screwed, such as removal of used fixing seats.

SUMMARY OF THE INVENTION

The present invention has been made under such circumstances, and it is an object of the present invention to prevent degradation in the degree of sealing of an optical box with a simple configuration.

In order to solve the above-mentioned problems, the present invention has the following configurations.

(1) A light scanning apparatus, including: a light source emitting a light beam; a rotary polygon mirror deflecting the light beam emitted from the light source so as to scan a photosensitive member with the light beam; an optical member configured to guide the light beam deflected by the rotary polygon mirror to the photosensitive member; an optical box on which the light source is mounted and which contains the rotary polygon mirror and the optical member; a cover mounted on a side wall of the optical box so as to cover an opening of the optical box, and the cover having a dust-proof member which is molded on the cover so as to prevent dust from entering into the optical box and sandwiched between the cover and the side wall of the optical box; and the dust-proof member including a plurality of convex portions which are protruded toward the optical box and configured to contact with a top of the side wall of the optical box opposed to the dust-proof member, and a concave portion which is provided between the plurality of convex portions and separated from the top of the side wall.

(2) An image forming apparatus, including: a photosensitive member; the light scanning apparatus described in Item (1), which is configured to radiate a light beam onto the photosensitive member to form an electrostatic latent image on the photosensitive member; a developing unit configured to develop the electrostatic latent image formed by the light scanning apparatus to form a toner image; and a transfer unit configured to transfer the toner image formed by the developing unit onto a recording medium.

According to the present invention, degradation in the degree of sealing of the optical box can be prevented with a simple configuration.

Further features of the present invention will become apparent from the following description of exemplary embodiments with reference to the attached drawings.

DESCRIPTION OF THE EMBODIMENTS

Embodiments of the present invention are described in detail below with reference to the attached drawings.

Embodiment

Overview of Image Forming Apparatus

Figure 1:
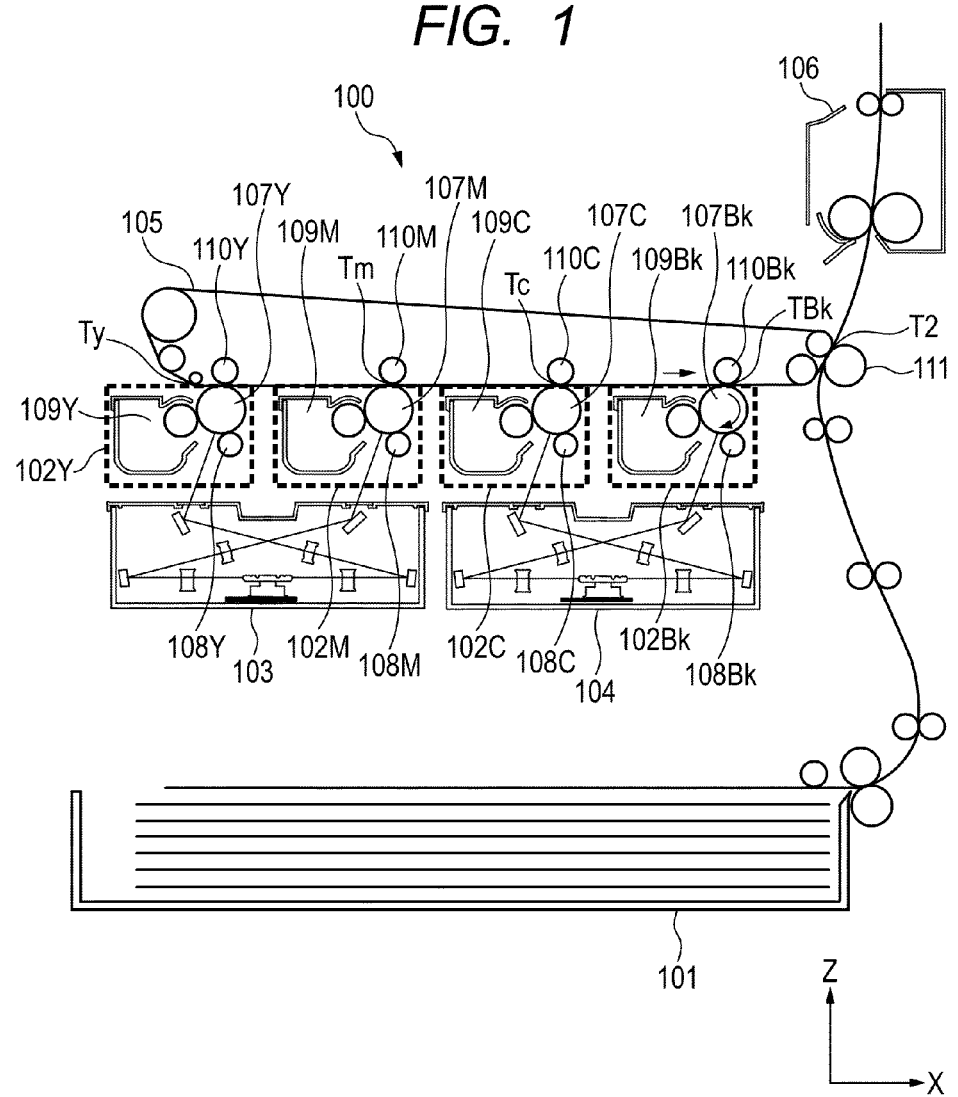
FIG. 1 is a schematic sectional view for illustrating a configuration of an image forming apparatus according to an embodiment of the present invention.

FIG. 1 is a schematic sectional view of an electrophotographic image forming apparatus 100 according to the embodiment. The image forming apparatus 100 of FIG. 1 includes a sheet-feeding unit 101, image forming units 102Y, 102M, 102C, and 102Bk, light scanning apparatus 103 and 104, an intermediate transfer belt 105, and a fixing device 106. The sheet-feeding unit 101 is configured to feed a sheet (also referred to as a recording sheet) and convey the sheet to a secondary transfer portion T2. The light scanning apparatus 103 is configured to radiate light beams to photosensitive drums 107Y and 107M in the image forming units 102Y and 102M to form electrostatic latent images on the photosensitive drums, respectively. The light scanning apparatus 104 is configured to scan photosensitive drums 107C and 107Bk in the image forming units 102C and 102Bk to form electrostatic latent images on the photosensitive drums, respectively. The image forming units 102Y, 102M, 102C, and 102Bk are configured to form toner images of yellow (Y), magenta (M), cyan (C), and black (Bk) on the photosensitive drums 107Y, 107M, 107C, and 107Bk, respectively. In the following, the reference symbols Y, M, C, and Bk representing colors of toner are omitted unless otherwise needed. The toner images formed on the photosensitive drums 107 of the respective image forming units 102 are transferred onto the intermediate transfer belt 105. At the secondary transfer portion T2, the toner images on the intermediate transfer belt 105 are collectively transferred onto the recording sheet fed from the sheet-feeding unit 101. The fixing device 106 is configured to fix the unfixed toner images, which have been transferred onto the recording sheet, on the recording sheet.

Components of the image forming units 102Y, 102M, 102C, and 102Bk of the image forming apparatus 100 according to this embodiment are the same, and hence description is hereinafter made using the image forming unit 102Y. In the following description, a direction of a rotation axis of a rotary polygon mirror 205 is referred to as a Z axis direction. A main scanning direction as a scanning direction of the light beam or a longitudinal direction of a reflecting mirror is referred to as a Y axis direction. A direction which is perpendicular to both the Y axis and the Z axis is referred to as an X axis direction.

The image forming unit 102Y includes the photosensitive drum 107Y serving as a photosensitive member, a charging device 108Y, and a developing device 109Y. When an image is formed, the charging device 108Y charges a surface of the photosensitive drum 107Y to a uniform electric potential. The charged surface of the photosensitive drum 107Y is exposed with light by the light scanning apparatus 103, thereby forming an electrostatic latent image. This electrostatic latent image is formed into a visible image (developed) with yellow toner supplied by the developing device 109Y, thereby forming a toner image. At a primary transfer portion Ty, a primary transfer roller 110Y is arranged so as to be opposed to the photosensitive drum 107Y. A predetermined transfer voltage is applied to the primary transfer roller 110Y so that the toner image formed on the photosensitive drum 107Y (on the photosensitive member) is transferred onto the intermediate transfer belt 105. Similarly, toner images of other colors on the photosensitive drums 107M, 107C, and 107Bk are also transferred onto the intermediate transfer belt 105 by primary transfer rollers 110M, 110C, and 110Bk arranged at primary transfer portions Tm, Tc, and TBk.

At the secondary transfer portion T2, a secondary transfer roller 111 is arranged so as to be opposed to the intermediate transfer belt 105. A predetermined transfer voltage is applied to the secondary transfer roller 111 so that the toner images on the intermediate transfer belt 105 are transferred onto the recording sheet, which is a recording medium conveyed from the sheet-feeding unit 101. The recording sheet bearing the transferred toner images is conveyed to the fixing device 106, and the unfixed toner images are heated to be fixed on the recording sheet by the fixing device 106. The recording sheet after having been subjected to the fixing by the fixing device 106 is delivered to a sheet delivery unit (not shown).

Light Paths of Light Scanning Apparatus

Next, the light scanning apparatus 103 and 104 are described. The image forming apparatus according to this embodiment includes the light scanning apparatus 103, which is configured to expose the photosensitive drums 107Y and 107M with light, and the light scanning apparatus 104, which is configured to expose the photosensitive drums 107C and 107Bk with light. The light scanning apparatus 103 and 104 have the same configuration as illustrated in FIG. 1. Therefore, description is hereinafter made using the light scanning apparatus 103.

Figure 2A:
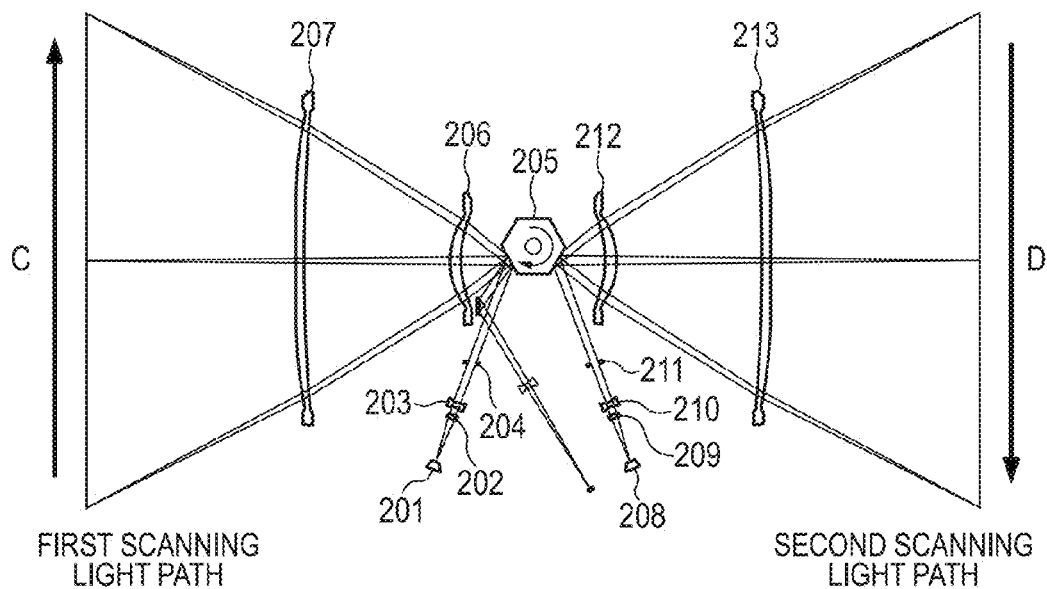
FIG. 2A is a main scanning sectional view of a light scanning apparatus according to the embodiment of the present invention.

FIG. 2A is a main scanning sectional view for illustrating light paths of the light scanning apparatus 103 configured to expose the photosensitive drums 107Y and 107M with light, and the light paths are illustrated as extending on a plane. A scanning direction of laser light through rotation of the rotary polygon mirror 205 is referred to as a main scanning direction. A direction which is orthogonal to the main scanning direction and perpendicular to the rotation axis of the rotary polygon mirror 205 is referred to as a sub-scanning direction. The main scanning section is a plane which is parallel to the scanning direction of the laser light and perpendicular to the rotation axis of the rotary polygon mirror 205 (plane having the rotation axis of the rotary polygon mirror as a normal line).

As illustrated in FIG. 2A, the rotary polygon mirror 205 is configured to deflect laser light emitted from a light source 201 leftward in FIG. 2A, and deflect laser light emitted from a light source 208 rightward in FIG. 2A. As a result, the laser light emitted from the light source 201 scans in a direction of the arrow C (first scanning light path), and the laser light emitted from the light source 208 scans in a direction of the arrow D (second scanning light path).

On the first scanning light path, the laser light (light beam) emitted from the light source 201 is transformed into parallel light by a collimator lens 202. The laser light is converged only in the sub-scanning direction by a cylindrical lens 203 arranged immediately after the collimator lens 202. The laser light converged only in the sub-scanning direction is shaped by a diaphragm 204 into a predetermined shape and thereafter formed into a linear image on a reflection surface of the rotary polygon mirror 205. The laser light formed into the image on the reflection surface of the rotary polygon mirror 205 is transformed into scanning light toward the photosensitive drum 107 through rotation of the rotary polygon mirror 205 in a direction of the arrow (clockwise direction) in FIG. 2A. The surface of the photosensitive drum 107 is scanned with the transformed laser light at constant speed through fθ lenses 206 and 207 serving as optical members.

On the second scanning light path, the laser light (light beam) emitted from the light source 208 is transformed into parallel light by a collimator lens 209. The laser light is converged only in the sub-scanning direction by a cylindrical lens 210 arranged immediately after the collimator lens 209. The laser light converged only in the sub-scanning direction is shaped by a diaphragm 211 into a predetermined shape and thereafter formed into a linear image on the reflection surface of the rotary polygon mirror 205. The laser light formed into the image on the reflection surface of the rotary polygon mirror 205 is transformed into scanning light toward the photosensitive drum 107 through rotation of the rotary polygon mirror 205 in the direction of the arrow (clockwise direction) in FIG. 2A. The surface of the photosensitive drum 107 is scanned with the transformed laser light at constant speed through fθ lenses 212 and 213 serving as optical members.

Configuration of Light Scanning Apparatus

Figure 2B:
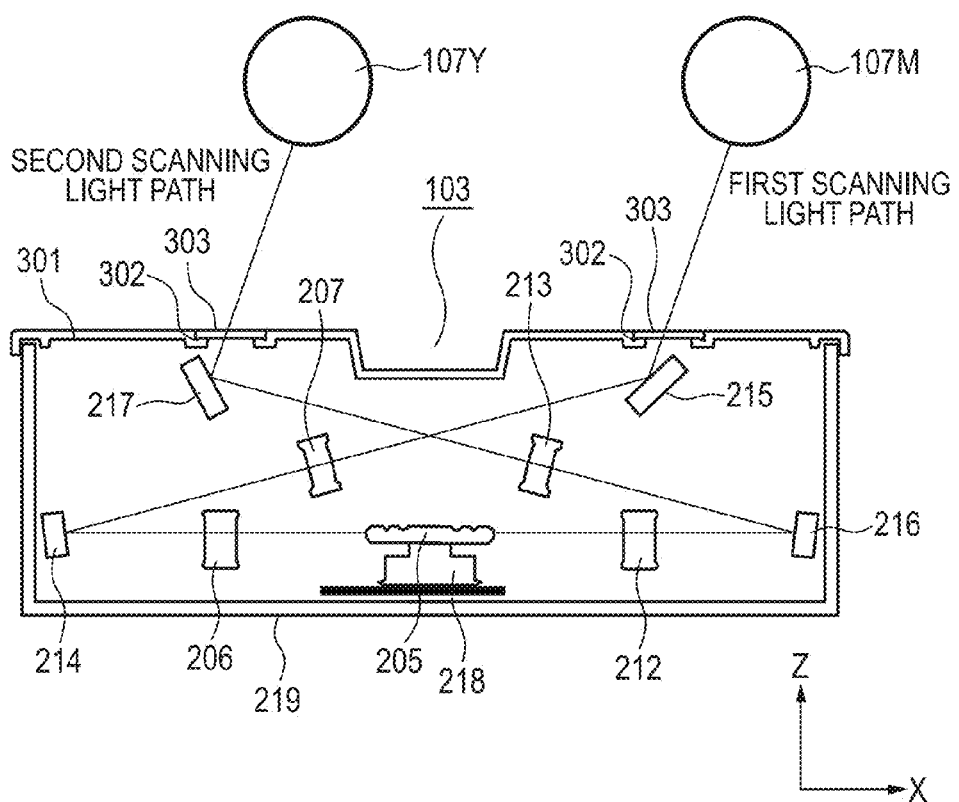
FIG. 2B is a sectional view for illustrating a configuration of the light scanning apparatus according to the embodiment of the present invention.

FIG. 2B is a sectional view for illustrating a configuration of the light scanning apparatus 103, which is configured to scan the photosensitive drums 107Y and 107M, described with reference to FIG. 2A. In FIG. 2A, the main scanning sectional view, in which the light paths of the laser light passing through an optical system including the lenses and reflecting mirrors (not shown in FIG. 2A) are developed in a plane, is described. In an actual light scanning apparatus, three-dimensional light paths are formed using the reflecting mirrors as illustrated in FIG. 2B. In FIG. 2B, the laser light emitted from the light source 201 is deflected by the rotary polygon mirror 205. The deflected laser light is reflected by a reflecting mirror 214, which is an optical member, after having passed through the fθ lens 206, and then is guided to the fθ lens 207. The laser light having passed through the fθ lens 207 is reflected by the reflecting mirror 215 and guided to the photosensitive drum 107M.

The laser light emitted from the light source 208 is deflected by the rotary polygon mirror 205. The deflected laser light is reflected by the reflecting mirror 216 after having passed through the fθ lens 212, and then is guided to the fθ lens 213. The laser light having passed through the fθ lens 213 is reflected by the reflecting mirror 217 and guided to the photosensitive drum 107Y. The rotary polygon mirror 205 is supported by a drive motor 218 and rotationally driven by the drive motor 218. In this embodiment, the rotary polygon mirror 205 and the drive motor 218 integrally construct a deflection unit.

As illustrated in FIG. 2B, the fθ lenses 206, 207, 212, and 213, the reflecting mirrors 214, 215, 216, and 217, the rotary polygon mirror 205, and the drive motor 218, which are optical components, are contained in an optical box 219, which is a housing, to construct the light scanning apparatus 103. The optical box 219 is often formed of material which is obtained by mixing synthetic resin, such as polycarbonate or polystyrene, with glass fiber for reinforcement. On an opening formed on top of the optical box 219 of FIG. 2B, an upper cover 301 is mounted so as to prevent dust from entering into the optical box 219. The upper cover 301 has openings for passage of the laser light to be guided to the photosensitive drums 107Y and 107M. For the purpose of preventing dust from entering into the optical box 219 through the openings, dust-proof glasses 303 are arranged over the openings on a side opposed to the photosensitive drums 107. The dust-proof glasses 303 are attached to the upper cover 301 by double-sided tapes 302.

Appearance of Light Scanning Apparatus

Figure 3A:
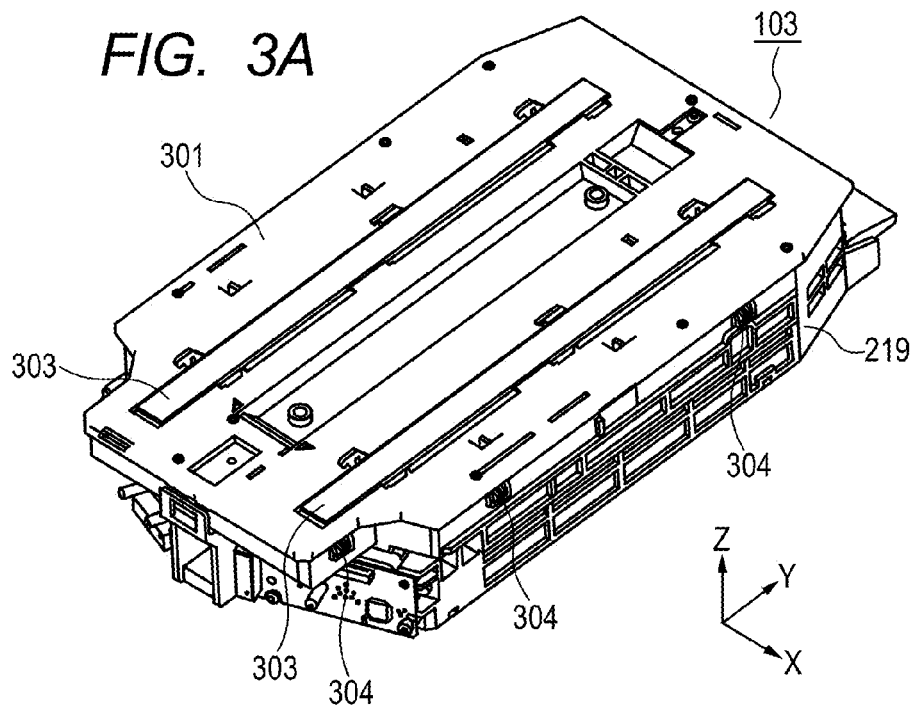
FIG. 3A is a perspective view for illustrating a state in which an upper cover of the light scanning apparatus is mounted according to the embodiment of the present invention.
Figure 3B:
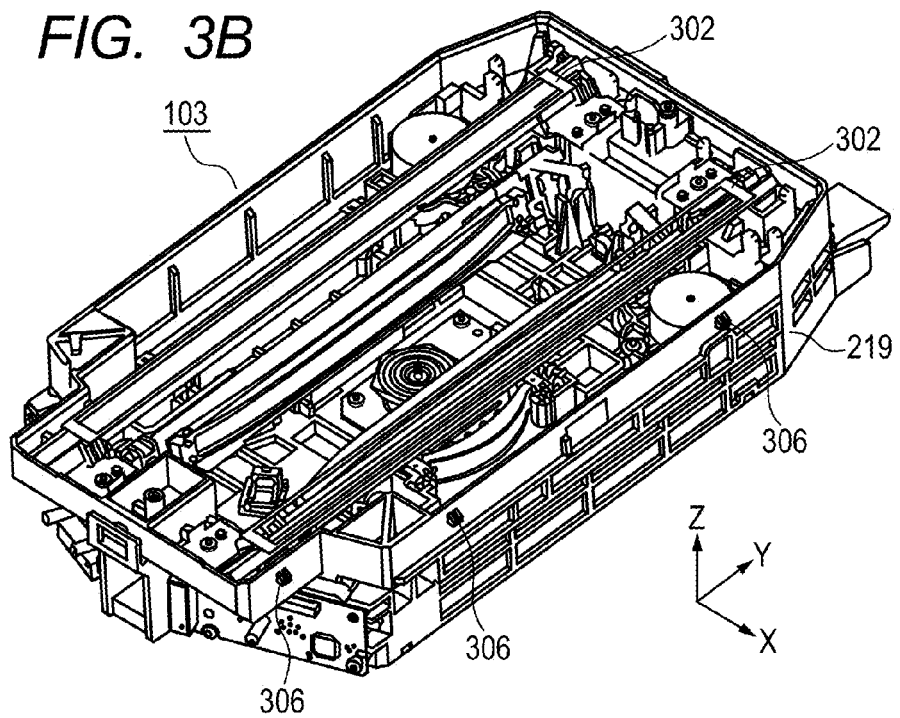
FIG. 3B is a perspective view for illustrating a state in which the upper cover of the light scanning apparatus is removed according to the embodiment of the present invention.

FIG. 3A and FIG. 3B are perspective views for illustrating an appearance of the light scanning apparatus 103. FIG. 3A is a perspective view for illustrating the appearance of the light scanning apparatus 103 under a state in which the upper cover 301 is mounted on the optical box 219. FIG. 3B is a perspective view for illustrating an internal configuration of the light scanning apparatus 103 under a state in which the upper cover 301 is removed. The dust-proof glasses 303 attached to the upper cover 301 by the frame-like double-sided tapes 302 (FIG. 3B) are provided on a side of the upper cover 301 opposed to the photosensitive drums 107. The laser light passes through the dust-proof glasses 303 toward the photosensitive drums 107. Each of the double-sided tapes 302 is provided in a frame-like form along an outer peripheral portion of the dust-proof glass 303 in order to attach the dust-proof glass 303 to the upper cover 301. The double-sided tapes 302 are hidden by the dust-proof glasses 303 in FIG. 3A. Thus, the double-sided tapes 302 are illustrated in FIG. 3B to clearly indicate the positions of the double-sided tapes 302. On an outer periphery of the upper cover 301, there are arranged a plurality of snap-fit parts 304 (FIG. 3A) which are engagement claws. Projections 306 (FIG. 3B), which are provided at positions corresponding to the snap-fit parts 304 of the optical box 219, are brought into engagement with the snap-fit parts 304, thereby being capable of mounting the upper cover 301 on the optical box 219.

Overview of Sealing Part

Figure 4:
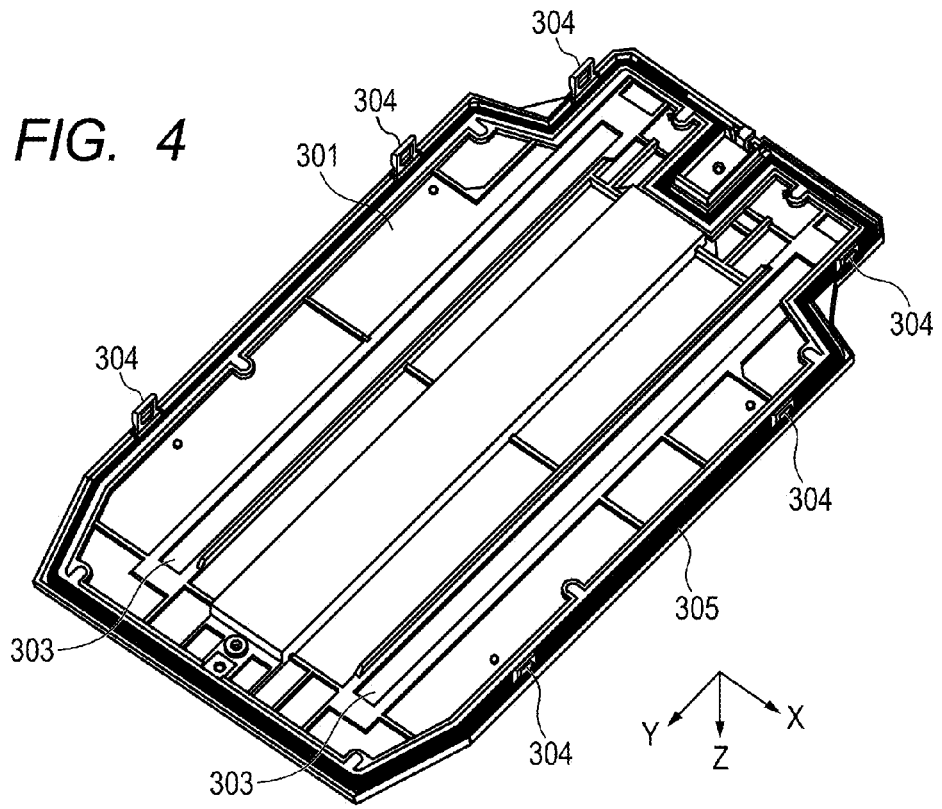
FIG. 4 is a perspective view for illustrating a back surface of the upper cover according to the embodiment of the present invention.

FIG. 4 is a perspective view for illustrating a back surface of the upper cover 301, that is, a surface of the upper cover 301 on a side opposed to the optical box 219 when the upper cover 301 is mounted on the optical box 219. On the back surface of the upper cover 301, there is provided a sealing part 305 (thick and black portion in FIG. 4) entirely on a peripheral portion to be brought into abutment against an outer peripheral edge (top surface/top portion in an outer peripheral portion), which is a side wall of the optical box 219, when the upper cover 301 is mounted on the optical box 219. The sealing part 305 is formed on the upper cover 301 so as to be integrated with the upper cover 301 by injecting a hot-melt adhesive, which is an elastic member, into a space between the upper cover 301 and a mold held in abutment against the upper cover 301. The snap-fit parts 304 provided on the upper cover 301 are brought into engagement with the projections 306 (FIG. 3B) provided on outer wall surfaces of the side wall of the optical box 219 so that the upper cover 301 is mounted on the optical box 219. The sealing part 305, which is a dust-proof member, is sandwiched between the optical box 219 and the upper cover 301. With this, inside and outside of the optical box 219 are isolated to seal the optical box 219 with the sealing part 305, thereby preventing dust from entering into the optical box 219.

Shape of Sealing Part

Figure 5:
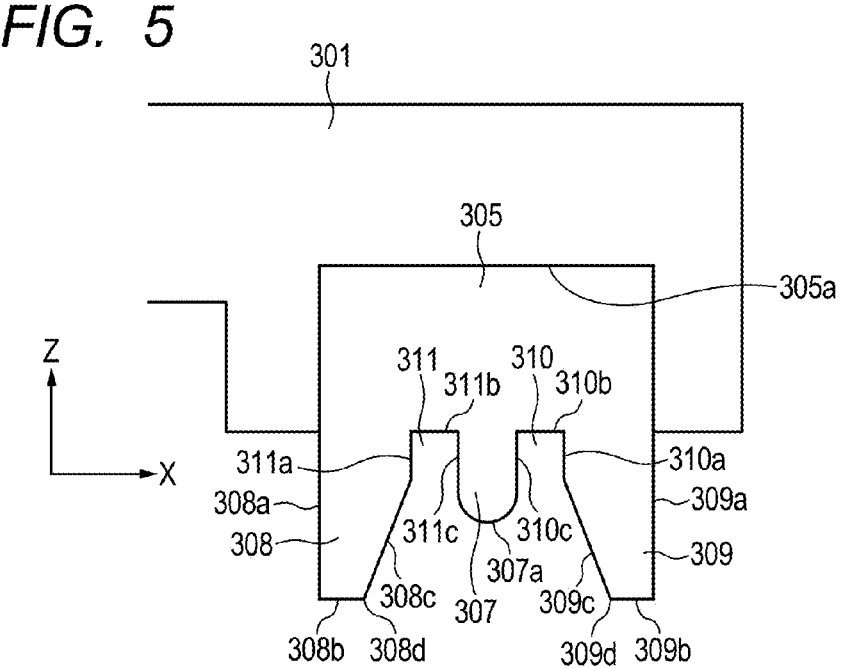
FIG. 5 is a sectional view for illustrating a shape of a sealing part according to the embodiment of the present invention.

FIG. 5 is a schematic sectional view for illustrating a sectional shape taken along a transverse direction of the sealing part 305 provided on the upper cover 301. In FIG. 5, the upper side corresponds to a front surface side of the upper cover 301, and the lower side corresponds to the back surface side of the upper cover 301, which is opposed to the optical box 219 when the upper cover 301 is mounted on the optical box 219. Further, in FIG. 5, the right side corresponds to an outer side of the optical box 219 when the upper cover 301 is mounted on the optical box 219. Further, in FIG. 5, the left side corresponds to an inner side of the optical box 219 when the upper cover 301 is mounted on the optical box 219, that is, a side on which the rotary polygon mirror 205 and the optical members are contained.

As illustrated in FIG. 5, the sealing part 305 includes convex-shaped portions 307, 308, and 309, which are convex portions having a convex shape and being protruded toward the optical box 219 (in a −Z axis direction), and concave-shaped portions 310 and 311, which are concave portions having a concave shape and being opposed to the optical box 219. The concave-shaped portion 310 is located between the convex-shaped portion 307 and the convex-shaped portion 309, and the concave-shaped portion 311 is located between the convex-shaped portion 307 and the convex-shaped portion 308. When the sealing part 305 is viewed from the optical box 219, the sealing part 305 has an opening formed by the convex-shaped portions 308 and 309, and grooves formed in the opening by the concave-shaped portions 310 and 311 are partitioned by the convex-shaped portion 307.

The convex-shaped portion 307 is located at a center of the sealing part 305 and has a surface 307a which is a convex portion having a semicircular sectional shape and being protruded toward the optical box 219. One end of the surface 307a is adjacent (connected) to a surface 310c of the concave-shaped portion 310, and another end of the surface 307a is adjacent (connected) to a surface 311c of the concave-shaped portion 311. A height of the convex-shaped portion 307 (height in the −Z axis direction (direction toward the optical box) from a bottom surface 305a of the sealing part 305) is lower than a height of a surface 308b of the convex-shaped portion 308 and a height of a surface 309b of the convex-shaped portion 309 (height in the −Z direction from the bottom surface 305a of the sealing part 305).

The convex-shaped portion 308 is located at an end of the sealing part 305 on an inner side of the optical box 219 when the upper cover 301 is mounted on the optical box 219, and has three surfaces 308a, 308b, and 308c. The surface 308a forms a standing wall portion, which stands toward the optical box 219, and is connected to the adjacent surface 308b. The surface 308b adjacent to the surface 308a is a flat surface which extends in the X axis direction, and is connected to the adjacent surface 308c. The surface 308c adjacent to the surface 308b is inclined with respect to a +Z axis direction and to a +X axis direction, and is connected to an adjacent surface 311a of the concave-shaped portion 311.

The convex-shaped portion 309 is located at an end of the sealing part 305 on an outer side of the optical box 219 when the upper cover 301 is mounted on the optical box 219, and has three surfaces 309a, 309b, and 309c. The surface 309a forms a standing wall portion, which stands toward the optical box 219, and is connected to the adjacent surface 309b. The surface 309b adjacent to the surface 309a is a flat surface which extends in the X axis direction, and is connected to the adjacent surface 309c. The surface 309c adjacent to the surface 309b is inclined with respect to the +Z axis direction and to a −X axis direction, and is connected to an adjacent surface 310a of the concave-shaped portion 310.

Figure 6:
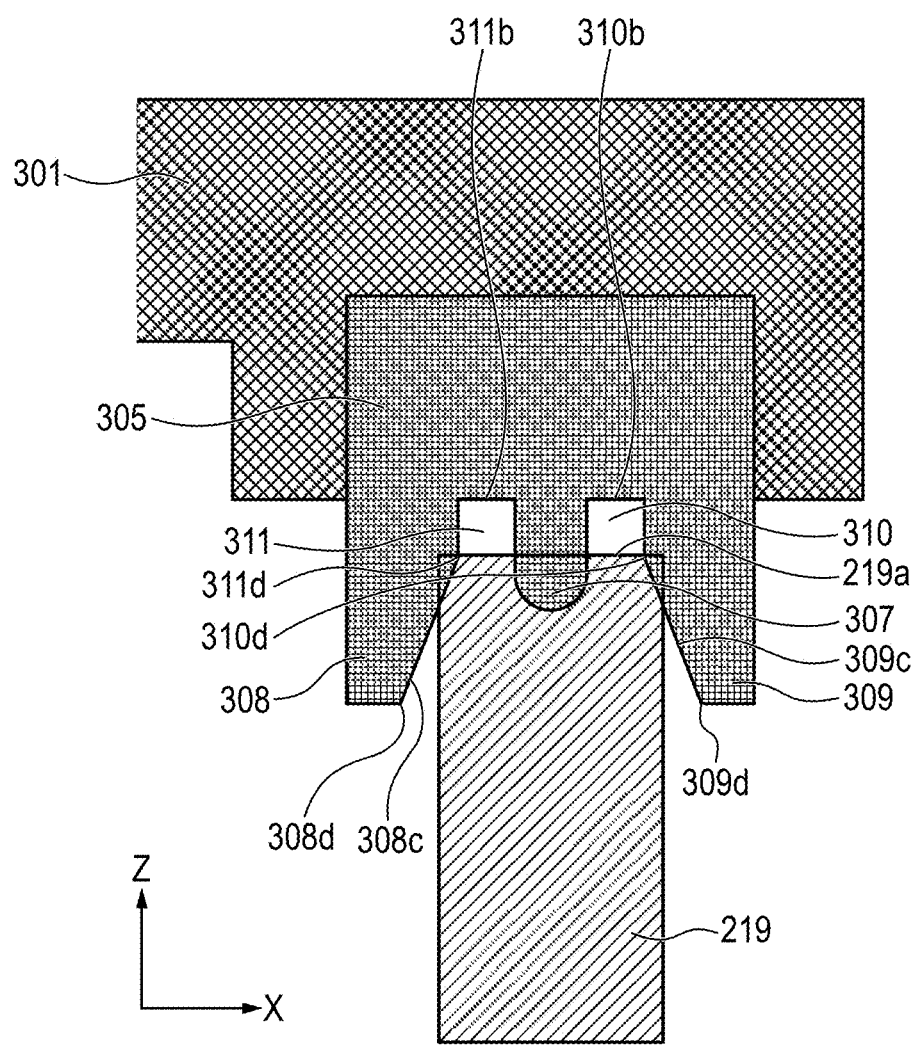
FIG. 6 is a sectional view for illustrating a state in which an optical box and the sealing part are brought into abutment against each other when the upper cover is mounted according to the embodiment of the present invention.

A width of the opening (length of the opening) of the sealing part 305 opposed to the optical box 219 is larger than a width (length in the X axis direction) of a top surface 219a, which is a distal end of an outer peripheral edge of the optical box 219, so that the top surface 219a is guided in the +Z axis direction of the sealing part 305 (see FIG. 6). The width of the opening of the sealing part 305 represents a length in the X axis direction from an edge 308d, which is a ridge line corresponding to a junction portion between the surface 308b and the surface 308c of the convex-shaped portion 308, to an edge 309d, which is a ridge line corresponding to a junction portion between the surface 309b and the surface 309c of the convex-shaped portion 309.

The concave-shaped portion 310 is located between the convex-shaped portion 307 and the convex-shaped portion 309 when the upper cover 301 is mounted on the optical box 219, and has three surfaces 310a, 310b, and 310c. The surface 310a forms a standing wall portion, which stands toward the optical box 219. One end of the surface 310a is connected to the surface 309c of the convex-shaped portion 309, and another end of the surface 310a is connected to the adjacent surface 310b. The surface 310b adjacent to the surface 310a is a flat surface which extends in the X axis direction (also a bottom surface of the concave-shaped portion 310), and is connected to the adjacent surface 310c. The surface 310c adjacent to the surface 310b forms a standing wall portion, which stands toward the optical box 219, and is connected to the adjacent surface 307a of the convex-shaped portion 307.

The concave-shaped portion 311 is located between the convex-shaped portion 307 and the convex-shaped portion 308 when the upper cover 301 is mounted on the optical box 219, and has three surfaces 311a, 311b, and 311c. The surface 311a forms a standing wall portion, which stands toward the optical box 219. One end of the surface 311a is connected to the surface 308c of the convex-shaped portion 308, and another end of the surface 311a is connected to the adjacent surface 311b. The surface 311b adjacent to the surface 311a is a flat surface which extends in the X axis direction (also a bottom surface of the concave-shaped portion 311), and is connected to the adjacent surface 311c. The surface 311c adjacent to the surface 311b forms a standing wall portion, which stands toward the optical box 219, and is connected to the adjacent surface 307a of the convex-shaped portion 307.

State of Sealing Part when Upper Cover is Mounted on Optical Box

FIG. 6 is a schematic view for illustrating a section of the sealing part 305 taken along the transverse direction under a state in which the sealing part 305 provided on the upper cover 301 and an outer peripheral edge of the optical box 219 (top surface 219a in the outer peripheral portion) are brought into abutment against (contact with) each other when the upper cover 301 is mounted on the optical box 219. As illustrated in FIG. 6, the convex-shaped portions 307, 308, and 309 of the sealing part 305 are held in abutment against the top surface 219a which is the distal end of the outer peripheral edge opposed to the upper cover 301 of the optical box 219. However, the concave-shaped portions 310 and 311 are not brought into abutment against (contact with) the top surface 219a. A width (length in the X axis direction) of the top surface 219a of the optical box 219 is smaller (narrower) than a width of the opening of the sealing part 305. Further, as illustrated in FIG. 6, the width of the top surface 219a of the optical box 219 is larger than a width (distance) between the two concave-shaped portions 310 and 311. The width between the two concave-shaped portions 310 and 311 represents a length in the X axis direction from an edge 311d, which is a junction portion between the surface 308c of the convex-shaped portion 308 and the surface 311a of the concave-shaped portion 311, to an edge 310d, which is a junction portion between the surface 309c of the convex-shaped portion 309 and the surface 310a of the concave-shaped portion 310. In other words, the distance from the edge 311d, which is an end of the surface 308c in a direction away from the side wall of the optical box 219, to the edge 310d, which is an end of the surface 309c in the direction away from the side wall, is narrower than the width of the top surface 219a. Therefore, when the upper cover 301 is mounted on the optical box 219, the top surface 219a of the optical box 219 is guided in the +Z axis direction, that is, toward the convex-shaped portion 307 along the inclination of the surfaces 308c and 309c of the convex-shaped portions 308 and 309 of the sealing part 305. As a result, the top surface 219a of the optical box 219 is brought into abutment against the surfaces 308c and 309c of the convex-shaped portions 308 and 309 and also brought into abutment against the surface 307a of the convex-shaped portion 307. The surface 307a is pressed by the top surface 219a of the optical box 219 in the +Z axis direction. Then, the sealing part 305 and the top surface 219a of the optical box 219 are in a state of being brought into abutment against each other as illustrated in FIG. 6. As a result, two closed spaces are formed by the sealing part 305 and the optical box 219. Specifically, there are formed a closed space which is formed by the top surface 219a of the optical box 219, the convex-shaped portions 307 and 308, and the concave-shaped portion 311, and a closed space which is formed by the top surface 219a of the optical box 219, the convex-shaped portions 307 and 309, and the concave-shaped portion 310.

As compared to a configuration in which the top surface 219a of the optical box 219 is entirely brought into abutment against a sealing part having a planar shape without a concave-shaped portion and having the same size as the sealing part 305, the configuration of the sealing part 305 according to this embodiment can reduce an area of a surface to be pressed by the abutment. Reducing the area of the surface to be pressed may reduce the repulsion force of the sealing member of the sealing part 305 caused by the pressing. As a result, deformation of the upper cover 301 due to the repulsion force of the sealing member can be prevented.

Difference in Repulsion Force in Accordance with Shapes of Sealing Part

Figure 7:
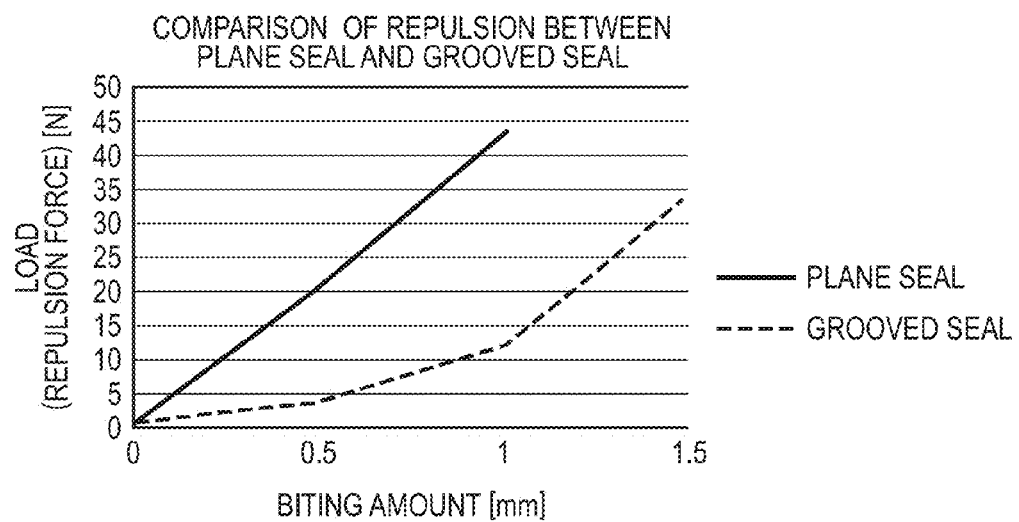
FIG. 7 is a graph for showing a comparison of a repulsion force of the sealing member in accordance with presence and absence of a groove according to the embodiment of the present invention.

FIG. 7 is a graph for showing a difference in the repulsion force of the sealing member in accordance with shapes of the sealing part. In this graph, there is shown a relationship between a biting amount of a pressing portion and a repulsion force when a sealing member (hot-melt adhesive) is used and a sealing part having a grooved shape with concave and convex portions (the grooved seal indicated by the broken line in FIG. 7) and a sealing part having a planar shape without a groove (the plane seal indicated by the solid line in FIG. 7) are pressed. In FIG. 7, the horizontal axis represents the biting amount (unit: mm (millimeter)) of the pressing portion with respect to the sealing part, and the vertical axis represents a load (repulsion force) (unit: N (Newton)) of the sealing part with respect to elastic deformation of the sealing part due to pressing of the pressing portion. For the measurement of FIG. 7, the sealing part 305 of this embodiment was used as the sealing part having a grooved shape. It can be observed from FIG. 7 that forming the sealing part into the grooved shape having concave and convex portions can reduce the repulsion force of the sealing member with respect to the biting amount at the time of pressing to from one-third to one-fifth as compared to the case of the planar shape without a groove.

With the configuration of the sealing part 305 of this embodiment, the top surface 219a of the optical box 219 presses the convex-shaped portions 307, 308, and 309, to thereby secure the biting amount in the +Z axis direction. The top surface 219a is not brought into abutment against the concave-shaped portions 310 and 311 of the sealing part 305 (the top surface 219a is separated from the concave-shaped portions 310 and 311). Therefore, in the sealing part 305 of this embodiment, an area of a surface to be pressed is reduced as compared to that of a sealing part of the same size having a planar shape without concave and convex portions. However, as the area of the surface of the sealing member to be pressed by the top surface 219a becomes smaller, a distance of isolating inside and outside of the optical box 219 through intermediation of the sealing member becomes smaller (shorter), and hence degradation of dust-proof performance is anticipated. In this embodiment, the height of the convex-shaped portion 307 is lower than the heights of the convex-shaped portions 308 and 309. Therefore, both ends of the top surface 219a of the optical box 219 are brought into abutment also against the convex-shaped portions 308 and 309, thereby pressing (biting) the sealing member not only in the Z axis direction but also in the X axis direction. With this, the sealing part 305 of this embodiment prevents not only the degradation in the degree of sealing when mounting the upper cover 301 on the optical box 219 but also the degradation in the dust-proof performance.

In this embodiment, the surfaces 308c and 309c of the convex-shaped portions 308 and 309 of the sealing part 305 are tapered. In the light scanning apparatus 103 according to this embodiment, positioning structure such as bosses is provided on each of the upper cover 301 and the optical box 219. The surfaces 308c and 309c are tapered, and hence, when the upper cover 301 is mounted on the optical box 219, the sealing part 305 can be prevented from being brought into contact with the optical box 219 to a maximum extent before the positioning structure between the upper cover 301 and the optical box 219 functions (for example, the bosses are fitted). Further, the surfaces 308c and 309c are tapered, and hence the top surface 219a of the optical box 219 can be guided to the convex-shaped portion 307 along the inclination of the surfaces 308c and 309c. Then, the top surface 219a is brought into abutment against the sealing part 305 at the position illustrated in FIG. 6. As a result, erroneous mounting can be prevented when the upper cover 301 is mounted on the optical box 219.

Figure 8:
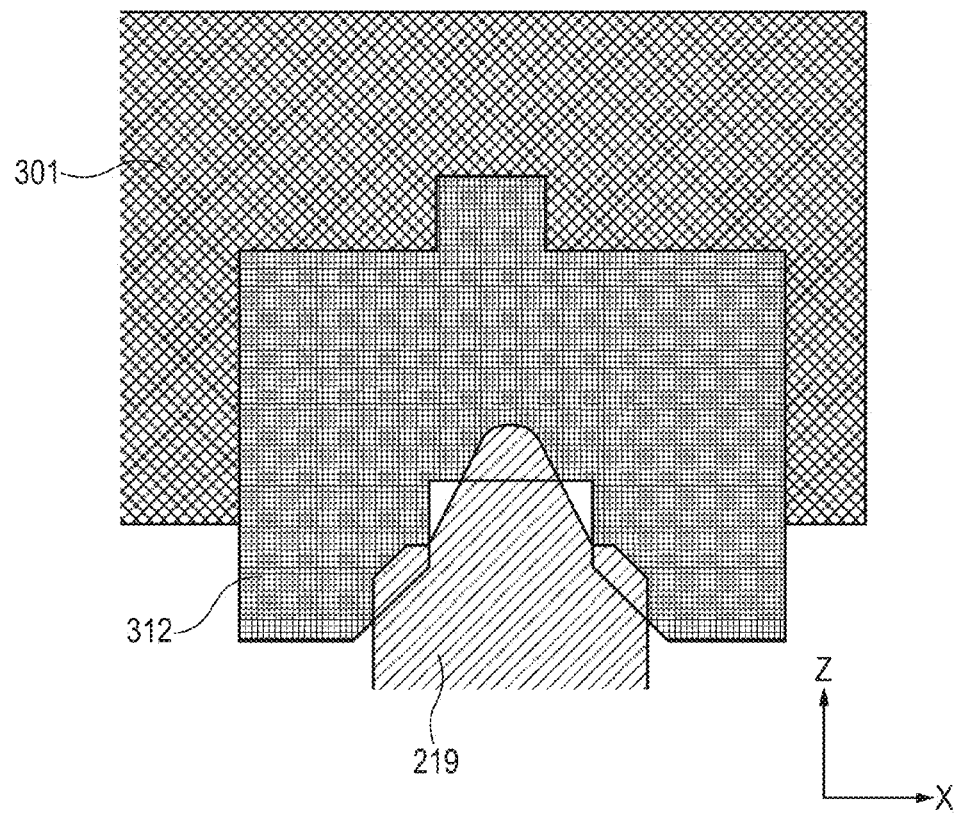
FIG. 8 is a sectional view for illustrating a state in which an optical box and a sealing part are brought into abutment against each other according to a comparative example for comparison with the embodiment of the present invention.

FIG. 8 is an illustration of a section of the upper cover 301 taken along the transverse direction according to a comparative example in which, for comparison with this embodiment, a surface of the optical box 219 to be brought into contact with a sealing part 312 is formed into a convex shape, and a surface of the sealing part 312 to be brought into contact with the optical box 219 is formed into a concave shape. In FIG. 8, a portion of the sealing part 312 to be brought into abutment against the optical box 219 is formed into the concave shape, to thereby reduce the repulsion force of the sealing member of the sealing part 312. In this embodiment, as illustrated in FIG. 5 and FIG. 6, the plurality of convex-shaped portions 307, 308, and 309 are formed on the sealing part 305. With this configuration, deformation of the upper cover 301 due to the repulsion force of the sealing member against the pressing by the optical box 219 can be prevented, and the fatigue degradation and deterioration of the sealing member can also be prevented. The fatigue degradation and deterioration of the sealing member can be suppressed as the squeezed amount of the sealing member due to the pressing is reduced with respect to the thickness of the sealing member at a location to be pressed. Similarly, as the squeezed amount of the sealing member due to the pressing is reduced with respect to the thickness of the sealing member at a location to be pressed, the load (pressure) exerted by the optical box 219 is absorbed by the sealing member of the sealing part 305, thereby being capable of suppressing the repulsion force of the sealing member.

In this embodiment, the convex-shaped portion 307 is formed on the sealing part 305, and the convex-shaped portion 307 is pressed and squeezed (deformed) by the top surface 219a of the optical box 219. For example, when the squeezed amounts due to the pressing by the top surface 219a of the optical box 219 are equal in the sealing part 312 of the comparative example illustrated in FIG. 8 and in the sealing part 305 of this embodiment, the thickness at the location to be pressed can be increased in this embodiment because the convex-shaped portion 307 is formed. In other words, in this embodiment, the thickness (length in the −Z axis direction) of the convex-shaped portion 307 at the location to be pressed by the optical box 219 can be increased, and hence the fatigue degradation and deterioration of the sealing member can be prevented. Further, the repulsion force of the sealing member can be reduced by increasing the thickness of the convex-shaped portions 307, and hence deformation of the upper cover 301 due to the repulsion force of the sealing member can also be prevented. In this embodiment, when the convex-shaped portions 308 and 309 formed at ends of the sealing part 305 are excluded, the convex-shaped portion 307 is the only one convex-shaped portion. However, the shape of the sealing part 305 is not limited to the configuration of having three convex-shaped portions. For example, when there is no limitation on molding conditions, or when the width of the sealing part 305 (length of the sealing part in the transverse direction) is large, convex-shaped portions may be additionally formed. For example, when one convex-shaped portion is additionally formed on the sealing part 305 of this embodiment, the sealing part includes four convex-shaped portions and three concave-shaped portions.

As described above, in the sealing part 305, the heights of the convex-shaped portions 308 and 309, which are formed at the ends of the sealing part 305, in the direction toward the optical box 219 are set to be larger than the height of the convex-shaped portion 307, which is formed at a center of the sealing part 305, in the direction toward the optical box 219. Further, in the sealing part 305, the surfaces 308c and 309c of the convex-shaped portions 308 and 309 are tapered. With this, the sealing part 305 is brought into contact with (abutment against) the top surface 219a of the optical box 219 when the upper cover 301 is mounted, and hence the convex-shaped portion 307 can be squeezed (pressed). Further, the top surface 219a is brought into abutment also against the convex-shaped portions 308 and 309, and hence the degree of sealing of the optical box 219 can be maintained. Further, the sealing part 5 has the convex-shaped portions 307, 308, and 309, which are brought into abutment against the top surface 219a of the optical box 219, and the concave-shaped portions 310 and 311, which are not brought into abutment against the top surface 219a, and hence the repulsion force of the sealing part 305 against the pressing can be reduced, thereby being capable of suppressing deformation of the upper cover 301. Further, the convex-shaped portion 307 is provided, and hence the thickness of the sealing member can be increased with respect to the squeezed amount (deformed amount) due to the pressing on the sealing member. As a result, temporal fatigue degradation and deterioration of the sealing member can be suppressed, and the repulsion force due to the pressing on the sealing member can be reduced.

As described above, according to this embodiment, degradation in the degree of sealing of the optical box can be prevented with a simple configuration.

Other Embodiment

In the embodiment described above, the sealing part 305 in which the two concave-shaped portions 310 and 311 are respectively formed between two convex-shaped portions of the three convex-shaped portions 307, 308, and 309 of the sealing part 305, is described. However, for example, there is a case where the width (length in the X axis direction) of the sealing part 305 is so small that, even when a plurality of concave-shaped portions are intended to be formed with the sealing member (hot-melt adhesive), only one concave-shaped portion can be formed due to limitation on the molding conditions.

Figure 9A:
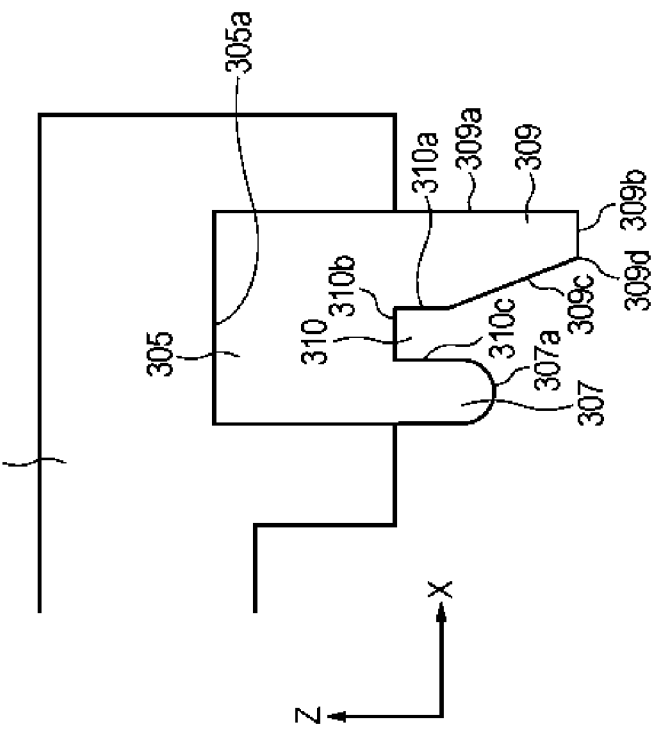
FIGS. 9A and 9B are sectional views for illustrating a shape of a sealing part according to other embodiments of the present invention.
Figure 9B:
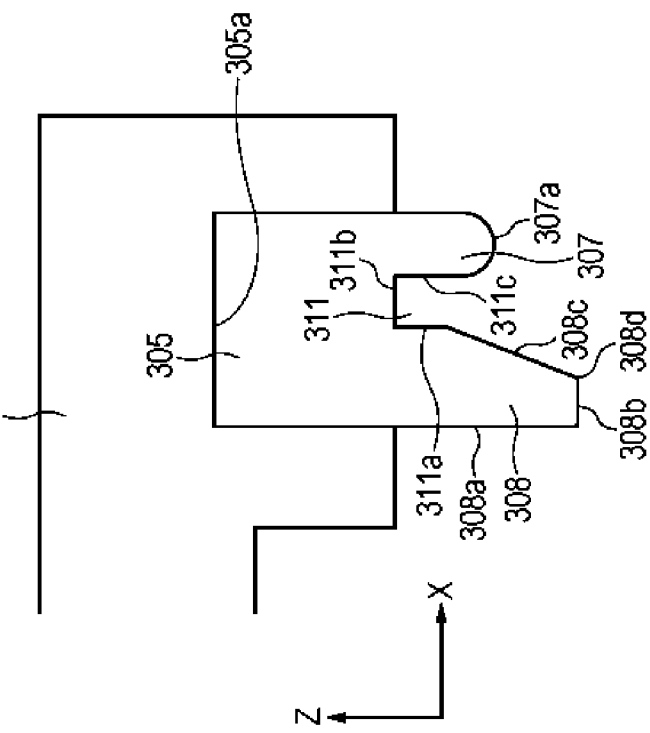

The sealing part in this case may be formed of two convex-shaped portions and one concave-shaped portion in conformity with the shape of the sealing part 305 of the embodiment, thereby being capable of maintaining the sealability of the optical box 219. Specifically, as shown in FIG. 9A, the sealing part is formed of the convex-shaped portion 307 (first convex portion), the convex-shaped portion 308 (second convex portion), and the concave-shaped portion 311. Or, as shown in FIG. 9B, the sealing part is formed of the convex-shaped portion 307 (first convex portion), the convex-shaped portion 309 (second convex portion), and the concave-shaped portion 310. The difference in the configurations of the two sealing parts is in that the second convex portion is provided whether on an inner wall surface side of the optical box 219 (in the case of the convex-shaped portion 308) or on an outer wall surface side of the optical box 219 (in the case of the convex-shaped portion 309). With this configuration, although the degree of sealing is lower than that of the configuration of the sealing part 305 of the embodiment due to absence of one convex-shaped portion and one concave-shaped portion, the temporal fatigue degradation and deterioration of the sealing member can be suppressed.

As described above, degradation in the degree of sealing of the optical box can be prevented with a simple configuration also in the other embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-161969, filed on Aug. 19, 2015, which is hereby incorporated by reference herein in its entirety.

What is claimed is:

1. A light scanning apparatus, comprising:
   a light source emitting a light beam;
   a rotary polygon mirror deflecting the light beam emitted from the light source so as to scan a photosensitive member with the light beam;
   an optical member configured to guide the light beam deflected by the rotary polygon mirror to the photosensitive member;
   an optical box on which the light source is mounted and which contains the rotary polygon mirror and the optical member;
   a cover mounted on a side wall of the optical box so as to cover an opening of the optical box, and the cover having a dust-proof member which is molded on the cover so as to prevent dust from entering into the optical box and sandwiched between the cover and the side wall of the optical box; and
   the dust-proof member including a plurality of convex portions which are protruded toward the optical box and which are configured to respectively contact with a top of the side wall of the optical box opposed to the dust-proof member, and a concave portion which is provided between the plurality of convex portions and separated from the top of the side wall.

2. A light scanning apparatus according to claim 1,
   wherein the plurality of convex portions comprise a first convex portion, a second convex portion, and a third convex portion,
   wherein the second convex portion and the third convex portion are located at ends of the dust-proof member in a transverse direction of the dust-proof member,
   wherein the first convex portion is located between the second convex portion and the third convex portion, and
   wherein a height of the first convex portion in a direction toward the side wall is lower than a height of the second convex portion and a height of the third convex portion in the direction toward the side wall.

3. A light scanning apparatus according to claim 2,
   wherein the top of the side wall opposed to the dust-proof member is configured to contact with the second convex portion and the third convex portion, and
   wherein the top of the side wall contacts with the first convex portion.

4. A light scanning apparatus according to claim 3,
   wherein a surface of the second convex portion and a surface of the third convex portion with which the side wall contacts are tapered so as to guide the side wall.

5. A light scanning apparatus according to claim 4,
   wherein a width of the top of the side wall in a transverse direction of the side wall is narrower than a width of an opening, which is formed by the second convex portion and the third convex portion, in the transverse direction of the dust-proof member.

6. A light scanning apparatus according to claim 4,
   wherein a width of the dust-proof member in the transverse direction from an end of the tapered surface of the second convex portion in a direction away from the side wall to an end of the tapered surface of the third convex portion in the direction away from the side wall is narrower than a width of the top of the side wall in a transverse direction of the side wall.

7. A light scanning apparatus according to claim 1,
   wherein the plurality of convex portions comprise a first convex portion and a second convex portion, which are located at ends of the dust-proof member in a transverse direction of the dust-proof member, and
   wherein a height of the first convex portion in a direction toward the side wall is lower than a height of the second convex portion in the direction toward the side wall.

8. A light scanning apparatus according to claim 7,
   wherein the top of the side wall opposed to the dust-proof member is configured to contact with the second convex portion, and
   wherein the top of the side wall is configured to contact with the first convex portion.

9. A light scanning apparatus according to claim 8, wherein a surface of the second convex portion against which the side wall is brought into abutment is tapered so as to guide the side wall.

10. A light scanning apparatus according to claim 7, wherein the second convex portion is provided on an outer wall surface side of the side wall of the optical box.

11. A light scanning apparatus according to claim 7, wherein the second convex portion is provided on an inner wall surface side of the side wall of the optical box.

12. A light scanning apparatus according to claim 1, wherein the dust-proof member is formed to be integrated with the cover, and is elastically deformed by abutment against the side wall.

13. An image forming apparatus, comprising:
  a photosensitive member;
  a light scanning apparatus configured to radiate a light beam onto the photosensitive member to form an electrostatic latent image on the photosensitive member;
  a developing unit configured to develop the electrostatic latent image formed by the light scanning apparatus to form a toner image;
  a transfer unit configured to transfer the toner image formed by the developing unit onto a recording medium;
  the light scanning apparatus having:
    a light source emitting the light beam;
    a rotary polygon mirror deflecting the light beam emitted from the light source so as to scan the photosensitive member with the light beam;
    an optical member configured to guide the light beam deflected by the rotary polygon mirror to the photosensitive member;
    an optical box on which the light source is mounted and which contains the rotary polygon mirror and the optical member; and
    a cover mounted on a side wall of the optical box so as to cover an opening of the optical box, and the cover having a dust-proof member which is molded on the cover so as to prevent dust from entering into the optical box and sandwiched between the cover and the side wall of the optical box; and
  the dust-proof member including a plurality of convex portions which are protruded toward the optical box and which are configured to respectively contact with a top of the side wall of the optical box opposed to the dust-proof member, and a concave portion which is provided between the plurality of convex portions and separated from the top of the side wall.

* * * * *